Patented July 6, 1948

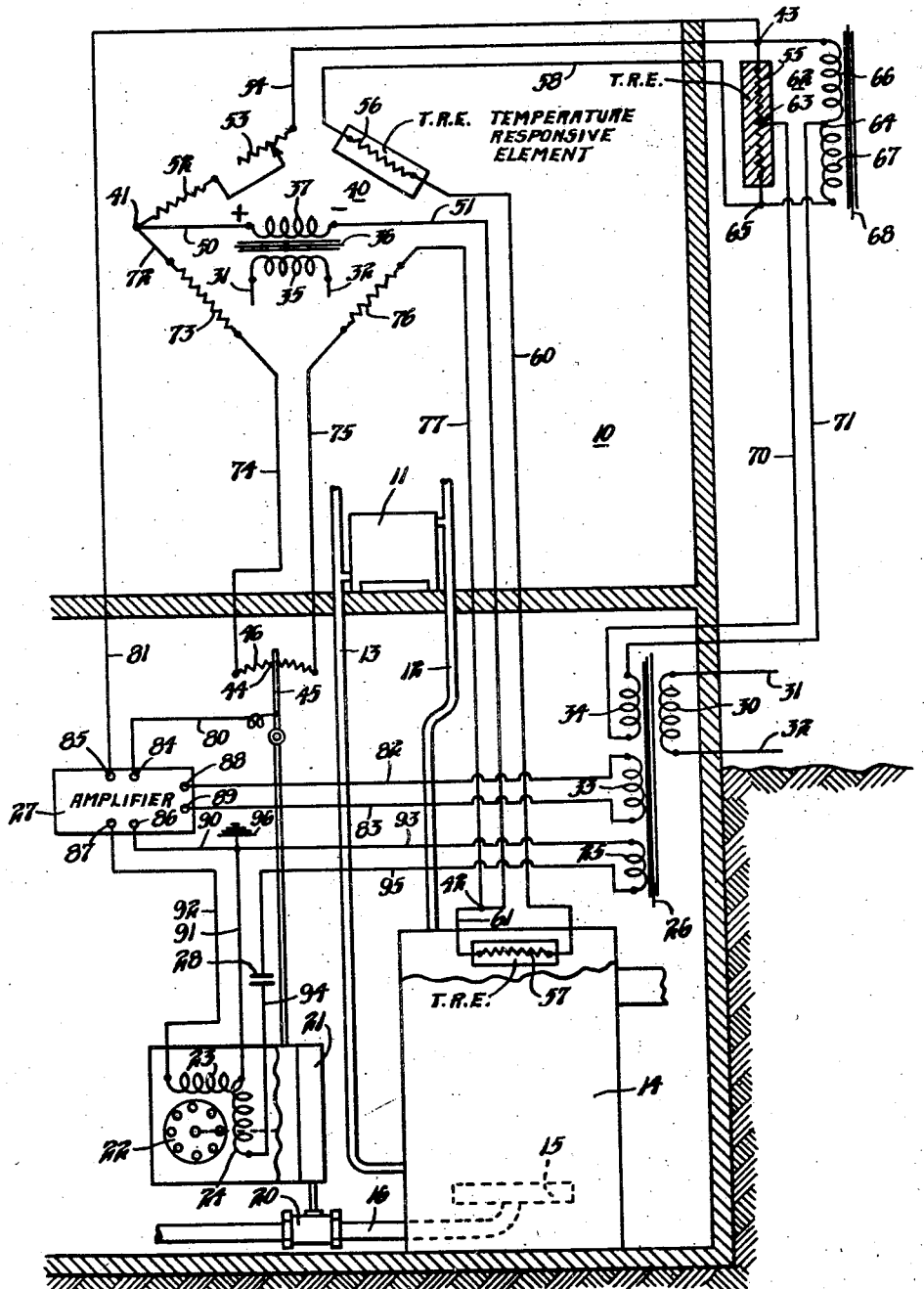

2,444,733

UNITED STATES PATENT OFFICE 2,444,733

IMPEDANCE BRIDGE

Willis H. Gille, St. Paul, and John V. Sigford, Minneapolis, Minn., assignors to Minneapolis-Honeywell Regulator Company, Minneapolis, Minn., a corporation of Delaware Original application August 28, 1941, Serial No. 408,594. Divided and this application October 27, 1944, Serial No. 560,662

5 Claims. (Cl. 323—75)

This application is a division of our copending application, Serial No. 408,594, filed August 28, 1941, which has now matured into Patent Number 2,375,988, issued May 15, 1945.

The present invention relates to impedance bridges, and more particularly to those of the type having a plurality of impedance elements in one leg of the bridge.

In connection with an impedance bridge having one or more condition responsive impedances, it is often necessary to locate one or more of those condition responsive impedances a considerable distance from the other elements of the bridge circuit. Unless some means is provided to compensate for the resistance of the leads extending to such remotely located condition responsive elements, changes in the resistance of these elements will affect the balance of the bridge so as to result in inaccurate operation thereof. It has accordingly been customary to provide an additional lead to such a remotely located condition responsive element to compensate for any change in resistance of the leads. By locating this additional lead in an adjacent arm of the bridge, any change in resistance of the leads will equally affect two adjacent arms of the bridge and hence will have no effect upon the balance of the bridge. No satisfactory means has, however, been provided for compensating for changes in lead resistance in a bridge in which there are two condition responsive impedance elements located remotely from the bridge and from each other, but in one arm of the bridge.

It is an object of the present invention to provide an impedance bridge including two condition responsive impedance elements in a single arm thereof and which are located remotely from each other as well as from the other elements of the bridge, in which means are provided for compensating the bridge for changes in the resistance of the leads connected to the remote elements.

This is accomplished by providing a lead extending between each terminal of each of the condition responsive impedances and the location of the other parts of the bridge, a lead extending between the bridge input circuit and one terminal of one of said impedances and a lead extending between the bridge output circuit and the opposite terminal of the other of said impedances.

For a further understanding of our invention, reference is made to the accompanying claims, specification, and drawing, in the single figure of which there is shown our improved impedance bridge employed in a temperature control system.

The problem of a number of remotely located condition responsive impedances in an impedance bridge often arises in connection with a temperature control system employing temperature responsive resistance elements responsive to various temperature conditions. We have accordingly shown our improved impedance bridge applied to such a temperature control system.

In the drawing

The drawing shows a space 10 heated by a radiator 11. Heating fluid, which may be, for example, steam or hot water, is supplied to the radiator 11 through a pipe 12 and exhausted fluid is drawn off from the radiator 11 through a return line 13. The fluid is heated by a furnace 14 provided with a burner 15, to which fluid fuel is supplied through a pipe 16.

This supply of fuel through the pipe 16 is controlled by a valve 20 whose position is modulated between open and closed positions by an operating mechanism 21. The mechanism 21 includes a reversible motor 22 of the split-phase type having a pair of field windings 23 and 24. Winding 24 is energized constantly through suitable connections with a secondary winding 25 of a transformer 26. Energization of winding 23 is controlled by an amplifier schematically indicated at 27. Suitable phase shifting means may be connected in series with one of the windings 23 or 24. In the system shown a condenser 28 is connected in series with winding 24.

The amplifier 27 may be of any suitable type in which the output voltage always has a definite phase relation to that of the input voltage. Such amplifiers are well known in the prior art. An amplifier which maintains a particularly close phase relationship between the input and output despite variations in the load placed on the amplifier is that shown in the copending application of Albert P. Upton, Serial No. 461,955, filed October 14, 1942.

Transformer 26 is provided with a primary winding 30 connected to power supply lines 31 and 32. In addition to the secondary winding 25, the transformer 26 also has secondary windings 33 and 34. Also connected to the supply lines 31 and 32 is a transformer primary winding 35. Primary winding 35 is a part of a transformer 36 having a secondary winding 37 which supplies a bridge circuit generally indicated at 40.

Bridge circuit 40 has input terminals 41 and 42 and output terminals 43 and 44. Output terminal 44 is the point of contact of a slider 45 with a slide wire resistance 46. Slider 45 is moved along the slide wire 46 by the motor 22 as it operates the valve 20.

Transformer secondary winding 37 is connected to bridge input terminals 41 and 42 by conductors 50 and 51, respectively, thereby forming with said conductors 50 and 51, the input circuit of the bridge 40.

The upper left-hand arm of the bridge circuit 40 connects input terminal 41 with output terminal 43, the latter being located remotely from the bridge circuit 40. This upper left arm includes a fixed resistance 52, a variable resistance 53, and a long conductor 54 connecting variable resistance 53 with a remotely located terminal 43. The function of variable resistance 53 is to adjust the setting of the bridge. That is, by varying the amount of resistance in the upper left arm of the bridge, the resistance necessary in the other arms of the bridge in order to produce a balanced condition is also changed.

The upper right arm of the bridge 40 connects output terminal 43 with input terminal 42 and includes three temperature responsive resistance elements 55, 56, and 57. This arm of the bridge circuit may be traced from terminal 43 through resistance element 55, a conductor 58, resistance element 56, a conductor 60, resistance element 57, and a conductor 61 to input terminal 42.

The temperature responsive resistance element 55 is located outside the building containing the space 10. The function of resistance element 55 is to cause an unbalance of the bridge circuit 40 in accordance with outside weather conditions affecting the operation of the temperature control system. The resistance element 55 may be formed of nickel or some other substance having an appreciable temperature coefficient of resistance, so that its resistance varies directly as the outside temperature.

We have found that by enclosing the resistance element 55 in some substance having a comparatively dark surface, its resistance may be made responsive to radiant energy conditions. For example, in bright sunlight, the dark surface will absorb radiant energy from the sun and cause an increase in the temperature of any elements enclosed within the dark surface. Since the presence of bright sunlight outside decreases the amount of heat which the furnace 14 must supply to the space 10, it is desirable that the operation of the control system be corrected in accordance with the outside radiant heat condition. We have found that by wrapping our outside temperature responsive element in kraft paper of a suitable shade, suitable radiant heat absorptive characteristics are imparted to the element.

It is also desirable that the resistance element 55 be made responsive to wind velocity, as the amount of heat required from the furnace 13 will be greater when a high wind is present outside the building than when the air is comparatively still. We have made the resistance element 55 responsive to wind velocity by heating it artificially. When a high wind is blowing, a large proportion of this artificial heat is carried away from the resistance element 55, thereby decreasing its temperature below normal. The element 55, therefore, reacts to the presence of a high wind in the same manner that it does to a decrease in temperature.

Instead of heating the resistance element 55 externally to make it respond to wind velocity, we find it more convenient to supply heat by means of an auxiliary bridge circuit 62, having input terminals 63 and 64 connected to the terminals of transformer secondary winding 34 by conductors 70 and 71, respectively. Input terminal 63 is the mid-point of resistance element 55. The two ends of element 55 form two of the arms of the auxiliary bridge circuit 62. The other two arms of bridge circuit 62 are formed by a pair of coils 66 and 67 oppositely wound on a common core 68. One terminal of each of the coils 66 and 67 is connected to the input terminal 64 of auxiliary bridge circuit 62. The opposite terminals of coils 66 and 67 are connected to terminals 43 and 65 of temperature responsive element 55. Current flowing in the auxiliary bridge circuit 62 passes through windings 66 and 67 in opposite directions. Since these coils are oppositely wound, the magnetic fluxes produced in the core 68 by the current flowing in the coils 66 and 67 are in the same direction. The coils 66 and 67 therefore offer relatively little impedance to the flow of current in the bridge circuit 62.

The coils 66 and 67 are, however, connected in series with respect to any current flowing in the bridge circuit 40. Since the coils 66 and 67 are wound in opposite directions, any current passing through the two coils in series produces in one coil a magnetic flux which reacts on the other coil to oppose the flow of this same current. It is therefore apparent that the coils 66 and 67 present a substantially infinite impedance to the flow of current from the bridge circuit 40.

It should also be apparent that current from the bridge 62 cannot flow in the bridge 40 as the bridge 62 is always balanced, and as far as the bridge 62 is concerned terminals 43 and 65 are at the same potential. The bridge 62 is always balanced because the coils 66 and 67 are of constant impedance and because any variation in the resistance of element 55 is automatically balanced since half of this resistance is in each of the two adjacent arms of the bridge.

To summarize, the operation of the temperature responsive element 55, it may be stated that any outside weather condition which tends to cause an increase in the heat loss from the space 10, also tends to cause a decrease in the resistance of element 55. Such conditions may be a drop in outside temperature, a decrease in the outside radiant heat, or an increase in wind velocity.

The function of temperature responsive element 56 is to introduce an unbalancing effect into the bridge circuit 40 in accordance with changes in temperature within the space 10. Such changes in temperature within the space 10 indicates the necessity of increasing or decreasing the amount of heat supplied to the space by the furnace 14.

The function of the temperature responsive resistance element 57 is to introduce an unbalance into the bridge circuit 40 in accordance with the temperature of the heating fluid at the output of the furnace 14. This fluid in the furnace 14 will be delivered to the space 10, and a change in its temperature is reflected in the change in resistance of element 57 so that delivery of the heated fluid to the space 10 is anticipated by the system.

The lower left arm of bridge circuit 40 connects input terminal 41 with output terminal 44 and includes a conductor 72, a fixed resistance 73, a conductor 74, and that part of slide wire resistance 46 between its left-hand terminal and the point of contact 44 of the slider 45.

The lower right-hand arm of bridge circuit 40 connects output terminal 44 with input terminal 42 and includes that part of slide wire resistance 46 between slider 45 and the right-hand terminal of resistance 46, a conductor 75, a fixed resistance 76, and a conductor 77.

A fundamental characteristic of bridge circuit is that, during balanced conditions, the product of the resistances of any two opposite arms of the bridge is equal to the product of the resistances of the other two opposite arms of the bridge. It is customary, when using a bridge circuit to measure the resistance of an element located remotely from the other part of the bridge, to compensate the bridge circuit so that the balance will not be disturbed by the long conductors connecting the remote element with the bridge. This is conventionally done by so connecting the remote element that the two conductors connecting it with the bridge are in different adjacent arms of the bridge. In this way, each of the two pairs of opposite arms contain one of the long conductors. Since these conductors lie physically close to each other practically throughout their length, any change in the ambient temperature of the medium through which they pass affects both arms of the bridge equally and therefore produces no unbalancing effect. Such a connection is conventionally accomplished by locating one of the terminals of the bridge circuit at a point near the remote element, as for example, the terminal 43 of the drawing. Because of the location of output terminal 43 at this point the conductor 54 is in the upper left arm of the bridge circuit while the conductor 58 is in the upper right arm of the bridge circuit.

It has not previously been realized, however, that complete compensation for the lead resistance could be secured when two remotely located resistance elements were connected in the same arm of the bridge circuit. We have shown such a circuit in the drawing in which both resistance elements 55 and 57 are located remotely from the main part of the bridge circuit 40. The manner in which leads 54 and 58 compensate the bridge circuit for each other's resistance has been explained above. With regard to resistance element 57, the lead 77 is in the lower right arm of the bridge circuit while the conductor 60 is in the upper right arm of the bridge circuit. Therefore, the resistance of each of these conductors opposes the effect of the other on the unbalance of the bridge circuit.

This method of compensating for the lead conductors of two remotely located resistance elements in a single arm of the bridge was not previously discovered because it is not obvious that the opposite terminal of the remotely located resistance element must be connected to a conductor which extends back to the location of the main part of the bridge circuit. By opposite terminal of the remotely located element is meant a terminal such as 65 in the drawing, which is opposite to terminal 43, as far as the resistance element 55 is concerned. In other words, the necessity of using the conductors 58 and 60 was not previously realized. As far as the applicant's system is concerned, temperature responsive resistance element 56 could be located in the lower left arm of the bridge circuit 40 as well as in the upper right. Regardless of the particular arm in which the resistance element 56 is connected, the conductors 58 and 60, extending physically parallel to the conductors 54 and 77, respectively, between the respective remote resistance elements 55 and 57 and the main part of the bridge circuit, are necessary in order to compensate the bridge circuit for the resistance of the lead.

In bridge circuits of the prior art, whenever two remote resistances were used in a single bridge arm, it was customary to connect the two remote elements directly together. A comparable result would be obtained by connecting our terminal 65 with the right-hand terminal of resistance 57 directly. It should be apparent that such a connection destroys any possibility of compensating the bridge circuit for the lead resistances by the method outlined above.

*Operation*

When the parts are in the position shown in the drawing, the bridge circuit 40 is balanced, and the furnace 14 is supplying an amount of heat to the space 10 which is just sufficient to balance the heat losses, thereby maintaining the space at the temperature which the system has been set to maintain by adjustment of the variable resistance 53.

Let it now be assumed that there is a decrease in resistance of one of the three temperature sensitive elements 55, 56, or 57. With regard to outdoor element 55, such a decrease in resistance indicates the existence of a condition which will cause an increased heat loss from the space 10. In the case of resistance element 56, such a decrease indicates the presence of such an increased heat loss. On the other hand, such a decrease in the resistance of element 57 indicates that the amount of heat supplied to the space 10 is about to be decreased. In any event, a decrease in resistance of any one of these three elements indicates that the amount of fuel supplied to the burner 15 should be increased if the temperature of the space 10 is to be maintained at its predetermined value.

For convenience in describing the operation of the system, the instantaneous polarity of the source of electrical energy will be assumed to be that indicated by the legend in the drawings. In that case, any decrease in resistance of the upper right-hand arm of bridge circuit 40 causes the potential of output terminal 43 to become more negative than the potential of output terminal 44. This change in potential of output terminal 43 causes a current to flow in the bridge output circuit in a direction from terminal 44 through slider 45, a conductor 80, amplifier input terminal 84, the input circuit of amplifier 27, amplifier input terminal 85, and a conductor 81 to output terminal 43.

Power is supplied to amplifier 27 from transformer secondary winding 33 through conductors 82 and 83. The current flowing in the input circuit of amplifier 27 produces a greatly amplified current in its output circuit. The amplified current in its output current energizes winding 23 of motor 22, flowing through a circuit which may be traced from output terminal 86 of amplifier 27 through conductors 90 and 91, winding 23 and a conductor 92 to output terminal 87 of amplifier 27.

Winding 24 of motor 22 is constantly energized through a circuit which may be traced from the upper terminal of transformer secondary winding 25 through a conductor 93, conductor 91, winding 24, a conductor 94, condenser 28, and a conductor 95 to the lower terminal of transformer secondary winding 25. Conductor 91, which is connected to the common terminal of windings 23 and 24, is grounded, as at 96.

Since the winding 24 is directly connected to transformer secondary winding 25, the time phase of current flowing through the winding 24 is fixed with respect to the time phase of the potential supplied by the winding 25. The condenser 28 is chosen so that the current through winding 24 leads the supply potential by approximately 90 electrical degrees. The time phase of the current flowing in winding 23 of motor 22 depends on the time phase of the output current of amplifier 27. The time phase of this output current depends in turn on the time phase of the amplifier input current, which is determined by the instantaneous direction of flow of current between output terminals 43 and 44 of bridge circuit 40. The output current of the bridge 40 may be either in phase or 180 electrical degrees out of phase with the potential supplied from lines 31 and 32. The particular phase relationship depends, as previously stated, upon the instantaneous direction of flow of current between terminals 43 and 44.

During the conditions at present under consideration, it has been indicated that a current is flowing in the output circuit of bridge 40 in a direction from terminal 44 to terminal 43. Let it be assumed that the connections are such that when current is flowing in this direction, it is 180 degrees out of phase with the supply line voltage. The output current of amplifier 27 is likewise approximately 180 degrees out of phase with the supply line voltage. The current in winding 23 therefore differs in phase from the supply current by 180 degrees, while the current in winding 24 leads the supply potential by only 90 degrees. This difference in phase of the current in windings 23 and 24 causes split-phase motor 22 to be driven in such a direction as to open the valve 20 wider. It may therefore be seen that an unbalance of bridge circuit 40 in such a direction as to indicate the need for an additional supply of heat to space 10 causes operation of motor 22 in such a direction as to increase the supply of fuel to the burner 15.

As motor 22 drives the valve 20 in opening direction, it also moves slider 45 to the right along slide wire 46. This motion of slider 45 causes the potential of output terminal 44 to become more negative. The opening motion of valve 20 and the movement of slider 45 to the right continues until the motion of slider 45 has caused a change in potential of output terminal 44 sufficient to balance the change in potential of terminal 43. At that time current ceases to flow in the input circuit of amplifier 27. Current also ceases to flow in the amplifier output circuit and the winding 23 is therefore deenergized, stopping the motor 22.

Now let it be assumed that an increase in resistance takes place in any one of the three temperature responsive elements 55, 56, or 57. This increase in resistance indicates a necessity of decreasing the supply of heat to the space 10, and causes output terminal 43 to become positive with respect to terminal 44. The current therefore flows through the output circuit of bridge 40 in a direction from terminal 43 to terminal 44. This current, flowing through the input circuit of amplifier 27 causes an amplified current to flow in the winding 23 of motor 22. The phase of this current in winding 23 will be opposite that under the conditions previously discussed, because the instantaneous direction of flow through the amplifier input circuit is opposite to that under the previous conditions. The current in winding 23 is therefore in phase with the supply potential. As the current in winding 24 is leading the supply potential in phase by 90 electrical degrees, the motor 22 will operate in a direction opposite to that which it rotated under the previous conditions.

The rotation of motor 22 will therefore cause movement of valve 20 towards closed position and movement of slider 45 to the left along slide wire 46. The movement of valve 20 in a closing direction will decrease the supply of heat to the space 10, and this movement will continue until slider 45 reaches a position such that terminal 44 is at the same potential as terminal 43. When this position is reached, current ceases to flow in the output circuit of bridge 40, winding 23 of motor 22 is therefore deenergized and the motor comes to rest.

It should be apparent to those skilled in the art that the condenser 28, or other phase-shifting means, may be connected in series with either winding of motor 22, without affecting the operation of the system.

It will be seen from the above description that despite the fact that resistor 55 is located at a substantial distance from resistor 57 and the other elements of the bridge, any change in resistance of the leads is completely compensated for.

While we have shown a preferred embodiment of our invention, it is to be understood that this is for purposes of illustration only and that the invention is to be limited only by the scope of the appended claims.

We claim as our invention:

1. An impedance bridge, comprising in combination, a pair of impedances connected in one arm of said bridge, said impedances being located at different points remote from the other parts of said bridge circuit, and means for compensating the arms of the bridge adjacent said one arm for the resistance of the leads in said one arm connecting said remote impedances with said bridge, said means consisting of two further leads extending to said impedances and forming elements of the adjacent arms of said bridge.

2. An impedance bridge, comprising in combination, a pair of temperature responsive impedances connected in one arm of said bridge, said impedances being located at different points remote from the other parts of said bridge circuit, and means for compensating the arms of the bridge adjacent said one arm for the change in resistance with temperature of the leads in said one arm connecting said remote impedances with said bridge, said means consisting of two further leads extending to said impedances and forming elements of the adjacent arms of said bridge.

3. An impedance bridge, comprising in combination, a pair of impedances connected in one arm of said bridge, said impedances being located at different points remote from the other parts of said bridge circuit, and means for compensating the arms of the bridge adjacent said one arm for the resistance of the leads connecting said remote impedances with said bridge, said last-named means comprising a lead extending between each terminal of each of said impedances and the location of said other parts of said bridge, a lead extending between the bridge input circuit and one terminal of one of said impedances, and a lead extending between the bridge output circuit and the opposite terminal of the other impedance.

4. In combination, an impedance bridge having four arms, a source of power connected between the junction of two of said arms and the junction of the opposite two arms, an amplifier connected between the junctions of said arms adjacent to those just named, one of said arms of said bridge comprising a pair of impedances, said impedances being located at different points remote from the other parts of said bridge circuit, and means for compensating the arms of the bridge adjacent said one arm for the change in resistance of the leads connecting said remote impedances with said bridge, said last-named comprising a lead extending between each terminal of each of said impedances and the location of said other parts of said bridge, a lead extending between one terminal of said source of power and one terminal of one of said impedances, and a lead extending between one terminal of said amplifier and the opposite terminal of the other impedance.

5. In combination, an impedance bridge, two impedances located remote from each other and from said bridge, a connection between said impedances comprising a pair of conductors, each attached to one terminal of each of said impedances and connected to each other at said bridge, said impedances and said conductors being included in one arm of said bridge, and means for compensating the adjacent arms of said bridge for the resistance of said conductors, said compensating means comprising conductors in each of said adjacent arms, said last-mentioned conductors being connected to the terminals of said impedances opposite the terminals to which said first-mentioned conductors are connected.

WILLIS H. GILLE.
JOHN V. SIGFORD.

REFERENCES CITED

The following references are of record in the file of this patent:
Electrical Measurements by Laws, 1st edition, 1917; pp. 226 and 227.